United States Patent [19]

Kraushaar et al.

[11] 4,304,491

[45] Dec. 8, 1981

[54] SINGLE SENSOR SPECTROMETER WITH HIGH SPATIAL AND TEMPORAL RESOLUTION

[75] Inventors: Robert J. Kraushaar, Tenafly, N.J.; Robert Mays, Dallas, Tex.; John J. Stapleton, East Brunswick, N.J.

[73] Assignee: International Telephone and Telegraph Corporation, New York, N.Y.

[21] Appl. No.: 145,929

[22] Filed: May 2, 1980

[51] Int. Cl.³ .............................................. G01J 3/02
[52] U.S. Cl. .................................... 356/326; 356/308; 356/51; 250/339
[58] Field of Search ................. 356/51, 308, 309, 326; 250/334, 338, 339, 342

[56] References Cited

U.S. PATENT DOCUMENTS

| | | | |
|---|---|---|---|
| 3,971,921 | 7/1976 | Schmit et al. | 356/308 X |
| 3,992,101 | 11/1976 | Dapper et al. | 356/308 |
| 4,043,668 | 8/1977 | Goetz et al. | 250/339 |
| 4,178,099 | 12/1979 | Williams | 356/308 |

Primary Examiner—F. L. Evans
Attorney, Agent, or Firm—John T. O'Halloran; Peter C. Van Der Sluys

[57] ABSTRACT

A spectrometer for use with optical elements which pass both undispersed and dispersed irradiation onto detectors coupled to a transversal filter and a comparitor means which open gates said filter to receive dispersed signals when an initial undispersed threshold is exceeded, thereafter said comparitor inhibits signals exceeding the undispersed threshold during spectral analysis of the dispersed signals.

5 Claims, 1 Drawing Figure

SINGLE SENSOR SPECTROMETER WITH HIGH SPATIAL AND TEMPORAL RESOLUTION

1. Field of the Invention

The present invention relates to a spectrometer; particularly one using a single sensor.

2. Background of the Invention

The present invention is directed towards a spectrometer utilizing infrared or irradiation detector and optical elements. Typical infrared scanning and image conversion may be realized through the use of electro optical or optomechanical scanning systems. The present device combines both.

In optomechanical scanning, a rotating prism or oscillating mirror perhaps of the Trichroic type is usually utilized to scan the spatial distribution of infrared radiation. The image formed by the optics of the device may be passed on to multiple detectors or detector array which output in turn may be processed to enhance or reduce features in the image.

However, such arrangements involve large high cost sensors e.g., PV-InSb infrared detector arrays which are expensive thus limiting their application. While the use of a single sensor arrangement would reduce its costs, existing applications find it ineffective since it is unable to distinguish between two objects close together in an instantaneous field of view, thus sacrificing spatial and temporal resolution.

SUMMARY OF THE INVENTION

It is an object of the present invention to provide for a single sensor utilizing CCD transversal filter combined with optical elements, which is at a relatively reduced cost while maintaining spatial and temporal resolution.

It is another object of the present invention to provide for such an arrangement having a measured confidence level for the spectral analysis.

The present invention provides for the use of a CCD transversal filter combined with optical elements which pass both the undispersed and dispersed irradiation onto detectors. The filter serves the function of pulse compression to generate a single high amplitude pulse combining all of the spectral components in a spectral waveform and sends this pulse to an activity scanner.

In conventional transversal filtering the output is formed by a summing of weighted samples of the input signal with a tapped delay line for sampling. CCD transversal filtering provides a simple and flexible analog time delay with the tapping and summing function as part of the device. The common CCD structure has matrix of analog shift registers designed to accept and transport information samples in the form of individual charged packets. These charged packets may be electrons generated by the adsorption of incident radiation. The charge packet integration and transport functions may be controlled and may be weighted as desired.

To maintain spatial and temporal resolution and providing a confidence level, a circuit is provided between the detectors and the filter. In this regard, a preamplified undispersed signal, which is of greater amplitude than dispersed signals, is used as a keying means to initiate the spectral analysis of the point source target being scanned. Once this occurs, the dispersed signals from that object follow and are allowed to enter the filter for processing. If during this time a second signal is received and is greater than a preset dispersed signal level, this second signal would be coming from a second object within the angle of dispersion. This signal would be prevented from entering the filter so as to interfere with the processing of the disperse signals from the first object, thereby preserving the latter spectral data.

Selectable taps are available on the delay line to allow spectral selection as desired. For example, the taps corresponding to the blue spike and red band signature components can be summed and under the control of a central processing unit, CPU, and compared with spectral information at shorter and longer wavelengths. This allows flexibility in the terms of spectral processing capability and allows comparison to be made in non-real time between alternate processing techniques.

The location and numbers of the second signals builds the confidence level in the spectral analysis which is done by weighting each disperse signal level accordingly. Thus the spatial resolution is preserved and the spectral analysis has a measured confidence level based upon the preset disperse signal level which is adjustable, adaptable and eventually predictive for each wavelength by preweighting the CCD transverse filtering for spectral analysis.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
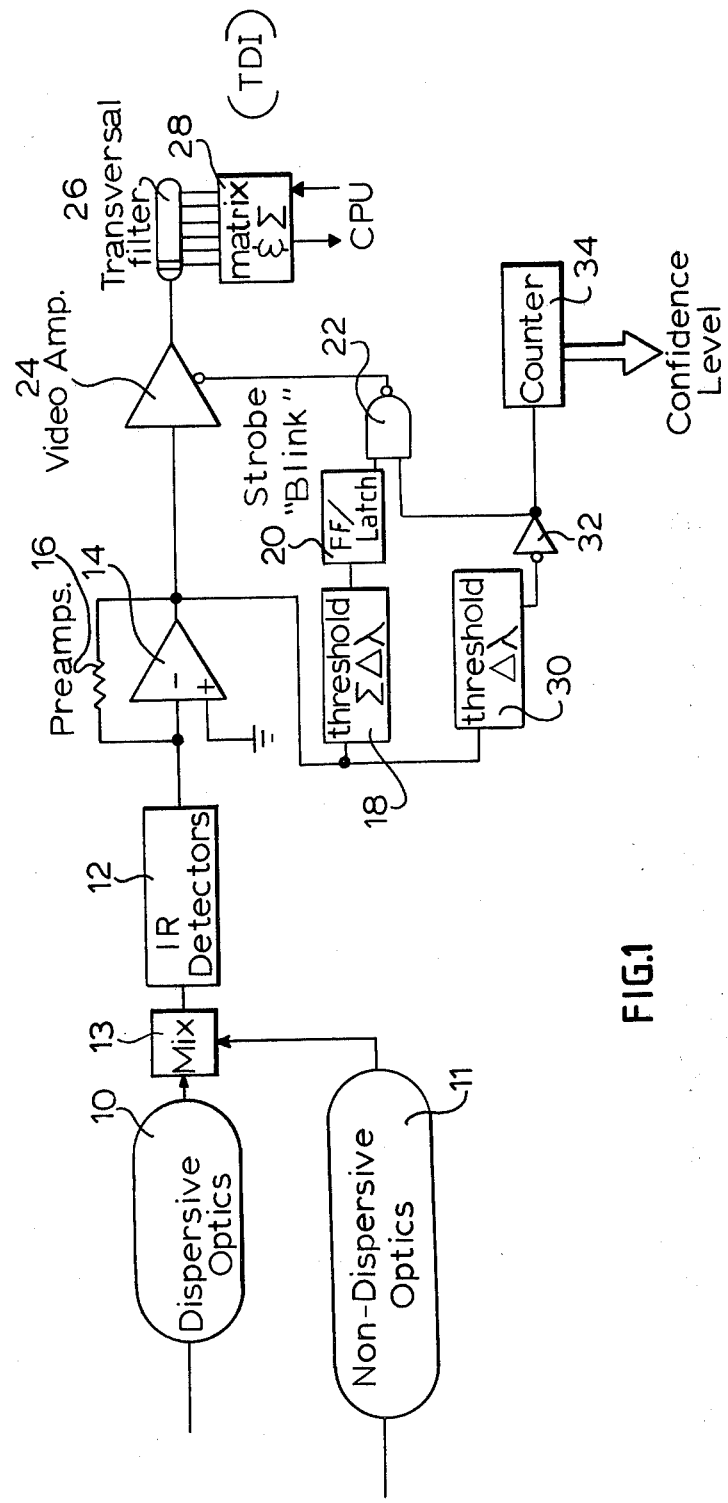
FIG. 1 is a somewhat schematic block diagram of a single sensor spectrometer incorporating the teachings of the invention.

In FIG. 1, a schematic of the spectrometer is shown which serves to provide a spectral analysis as a function of the scanning mechanism to give point source resolution. In this regard, the scanner includes scanning or optic elements 10 and 11 which serve to pass both dispersed and non-dispersed incident radiation, typically infrared. This dispersed and non-dispersed radiation would be that from an angle of dispersion for a single point in time. The type of optics utilized may be, for example, that of rotary prism or oscillating mirror perhaps of the Trichroic type modified to pass both undispersed and dispersed irradiation as aforementioned.

The irradiation is then mixed by mixer 13 which passes both the dispersed and undispersed irradiation onto irradiation or infrared detectors 12. The absorption of such radiation by the detectors 12 results in the generation of a signal proportional to the amount of incident radiation and provides a signal which is then preamplified by amplifier 14, having feedback resistor 16, in a desired amount.

The spectrometer utilizes the undispersed signal generated by the detectors 12 as a keying means to initiate spectral analysis of the dispersed signal. Since the amplitude of the undispersed signal is high in comparison to the dispersed signal, when used as a keying means, spectral analysis of undesired noise may be prevented. This may be accomplished through the use of a comparator or threshold detector 18. This is set to monitor the signal due to the undispersed irradiation and may be adjusted so that it is sufficiently high to eliminate undesired noise as desired.

In this regard, in operation the preamplified output signal must first exceed an undispersed threshold i.e., $$\left( \sum_{i=1}^{N} Vi(\Delta\lambda) \right)$$

which is set by adjusting threshold detector 18 which is connected to the amplifier output which serves to "open gate" the device. Otherwise the signal is inhibited from further processing. In this regard, the threshold detector 18 connects to a flip-flop latch 20 which in turn connects to an input of gate 22 which may be of the NAND type. The output of the gate 22 connects to a video amplifier 24 whose output connects to a transversal filter 26 which is of the CCD type.

If during operation the undispersed threshold is exceeded, it indicates that an object within the angle of dispersion is giving off sufficient irradiation to be monitored. Once the undispersed threshold is exceeded, the latch 20 is high and since there is no other input to the gate 22, its output remains high and the CCD input is open gated to receive N samples via video amplifier 24. The signal corresponding to the undispersed irradiation is not utilized in spectral analysis but merely as an indicator that spectral analysis of the signal following should begin.

The CCD, as aforementioned, provides time delay integration and transversal filtering and serves the function of pulse compression to generate a single high amplitude pulse combining all the spectral components in a spectrally dispersed waveform, which may be used by an activity scanner for image construction etc.

The samples following the undispersed signal relate to dispersed radiation now fed into the transversal filter 26 and are used for spectral analysis. In this regard, the matrix and integration operation 28 of the CCD provides for selectable taps on the time delay line to allow spectral selection and may correspond to the various signature components of the signal which in turn may be summed and under the control of the CPU, compared with spectral information at shorter and longer wavelengths which allow for very flexible spectral processing capability.

Once the undispersed signal passes through keying operation of the remaining signals of perhaps a sample N, the sensors are expected to be low, relating to the dispersed signal. If it is not low, then it would indicate that another object has entered within the angle of dispersion, meaning that the scanning or optical elements have passed to a second object, with the time sequence of it passing to the second object due to the scan rate of the optics.

To prevent the irradiation from the second object from interferring with the open gate analysis of the first, when a dispersed threshold (Vi$\Delta\lambda$) is exceeded, for example, at sample J with $1 \leq J \leq N$, the signal is prevented from entering the CCD transversal filter. This is accomplished by providing for a dispersed threshold detector or comparator 30, in a parallel connection with that of the undispersed threshold detector 18, coupled to the preamplifier output.

The output of this threshold detector 30 connects to the gate 22 and a counter 34 via an inverter 32. A signal from detector 30 at the gate 22 causing a low output causing a "closed gate" strobe to "blink" which prevents the high undispersed signal from entering the CCD transversal filter via video amplifier 24 which would interfere with its analysis. The spectral data from the object being analyzed is preserved thereby preventing loss of spatial resolution.

The counter 34 also receives a signal from the detector 30 and counts the location and occurances of the J signals. The location and number of Js yields the Confidence Level in the spectral analysis which is done by weighting each Vi$\Delta\lambda$. Thus the spatial resolution is preserved and the spectral analysis has a measured Confidence Level based on the close-gate threshold which is adjustable, adaptable, and eventually predictive for each wavelength by preweighting the CCD transversal filtering for spectral analysis.

While a detailed description of the preferred embodiment has been disclosed and described in detail herein its scope should not be limited thereby but should be determined by that of the appended claims.

What is claimed is:

1. A spectrometer for use with optical elements which pass both undispersed and dispersed irradiation onto detectors, comprising:
   an irradiation detector capable of receiving dispersed and undispersed irradiation and providing an output signal proportional to said irradiation, with a first signal proportional to the undispersed irradiation and a second signal proportional to dispersed radiation;
   a filter means having an input coupled to said detector and adapted to receive a signal therefrom for spectral analysis;
   a comparitor means having a first threshold level relative to the first signal and a second threshold level relative to the second signal and coupled to said detector and filter means, said comparitor means being capable of open gating the filter means for spectral analysis when the first signal exceeds the first threshold level and close gating the filter means inhibiting the passing of the first signal thereto when the second threshold level is exceeded during spectral analysis; and
   wherein in operation of the device when a first signal exceeds the first threshold level, the filter means is open gated to receive second signals but closed gated by the comparator rom receiving first signals.

2. The spectrometer in accordance with claim 1 which further includes a counting means coupled to said comparator means and capable of counting the number of first signals from the detector when said filter means is open gated with the location and number of first signals capable of providing a confidence level in spectral analysis.

3. The spectrometer in accordance with claims 1 or 2 which further includes a video amplifier coupled to said filter means and capable of conveying a signal thereto; a preamplifier coupled to said detector and capable of receiving a signal therefrom and conveying said signal to the video amplifier; said preamplifier output also coupled to said comparator means; and said comparator means being coupled to said video amplifier to control its operation and therefore the signal input to the filter means.

4. The spectrometer in accordance with claim 3 wherein said filter means is of the CCD type.

5. The spectrometer in accordance with claim 4 further includes a central processing unit coupled with said CCD which is used to control spectral analysis.

* * * * *